(12) United States Patent
Hung et al.

(10) Patent No.: US 8,687,335 B2
(45) Date of Patent: Apr. 1, 2014

(54) ELECTRONIC CIRCUIT BREAKER OF A POWER SUPPLY HAVING DUAL OUTPUT PORTS

(75) Inventors: Ming-Huang Hung, New Taipei (TW); Ming-Yung Peng, New Taipei (TW); Jui-Yang Chiu, New Taipei (TW)

(73) Assignee: Acbel Polytech Inc., New Taipei (TW)

( * ) Notice: Subject to any disclaimer, the term of this patent is extended or adjusted under 35 U.S.C. 154(b) by 333 days.

(21) Appl. No.: 13/317,626

(22) Filed: Oct. 24, 2011

(65) Prior Publication Data
US 2012/0206847 A1 Aug. 16, 2012

(30) Foreign Application Priority Data
Feb. 15, 2011 (TW) .............................. 100202752 U (51) Int. Cl.
| H02H 3/08 | (2006.01) |
| H02H 9/02 | (2006.01) |
| H02H 9/08 | (2006.01) |
| H02H 7/00 | (2006.01) |
| H02H 9/00 | (2006.01) |

(52) U.S. Cl.
USPC ............................ 361/93.1; 361/18; 361/93.9

(58) Field of Classification Search
USPC .................. 361/18, 91.1, 93.1, 93.9; 323/276
See application file for complete search history.

(56) References Cited

U.S. PATENT DOCUMENTS

| 6,351,360 B1 * | 2/2002 | Kotowski et al. ............. 361/103 |
| 7,672,107 B2 * | 3/2010 | So ................................ 361/93.9 |
| 8,305,784 B2 * | 11/2012 | Lu et al. .......................... 363/65 |
| 8,493,696 B2 * | 7/2013 | Komatsuzaki .................. 361/18 |

* cited by examiner

*Primary Examiner* — Rexford Barnie
*Assistant Examiner* — Christopher Clark (57) ABSTRACT

An electronic circuit breaker of a power having dual output ports has an input port, two output ports, two field effect transistors, two current detection circuits and two control circuits. The control circuit has a silicon controlled rectifier (SCR) and an activation circuit detecting if a short circuit is present at one of the output ports through one of the current detection circuits, activating the SCR to turn off a corresponding FET after the occurrence of the short circuit, and disconnecting a corresponding output port from the input port. Due to the characteristics of the SCR, the SCR, once activated, stays in an on state between its anode and cathode. After the current of the output returns to its normal state, the FET is still turned off. Accordingly, high-frequency large current arising from alternately switching between the on and off states of the FET can be avoided.

20 Claims, 6 Drawing Sheets

ELECTRONIC CIRCUIT BREAKER OF A POWER SUPPLY HAVING DUAL OUTPUT PORTS

BACKGROUND OF THE INVENTION

1. Field of the Invention

The present invention relates to an electronic circuit breaker of a power supply, and more particularly to an electronic circuit breaker of a power supply having dual output ports to avoid generation of high-frequency large current oscillation and protect against circuit damage.

2. Description of the Related Art

Power supplies serve to convert AC power from AC mains into DC power and supply the DC power to various electric appliances. One type of power supplies is equipped with two DC voltage output terminals through which power is supplied simultaneously. To prevent such power supplies from burning out due to overload or short circuit occurring at one of the DC voltage output terminals, each output terminal further has an electronic circuit breaker serially connected therewith.

Figure 5:
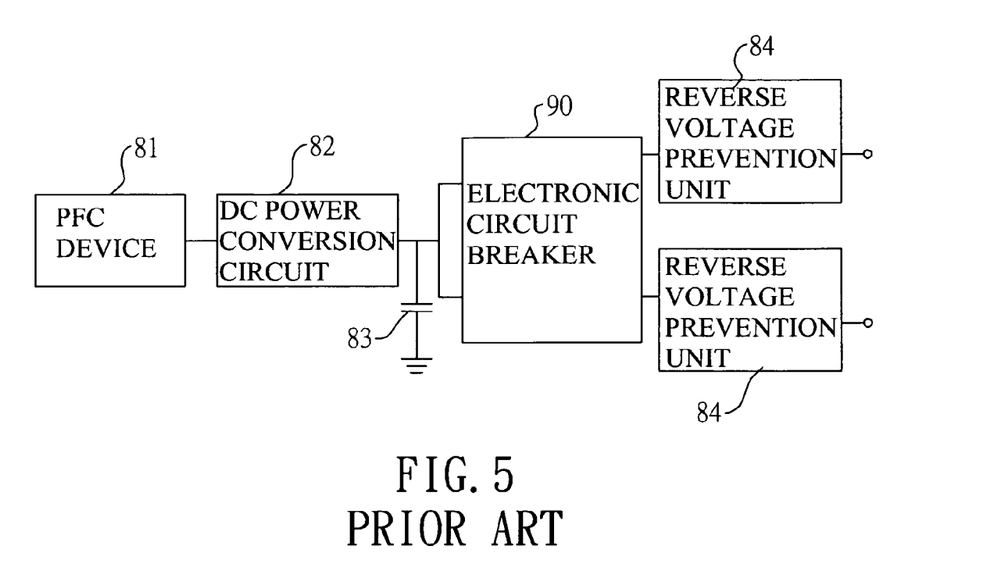
FIG. 5 is a functional block diagram of a conventional electronic circuit breaker of a power supply having dual output ports.
Figure 6:
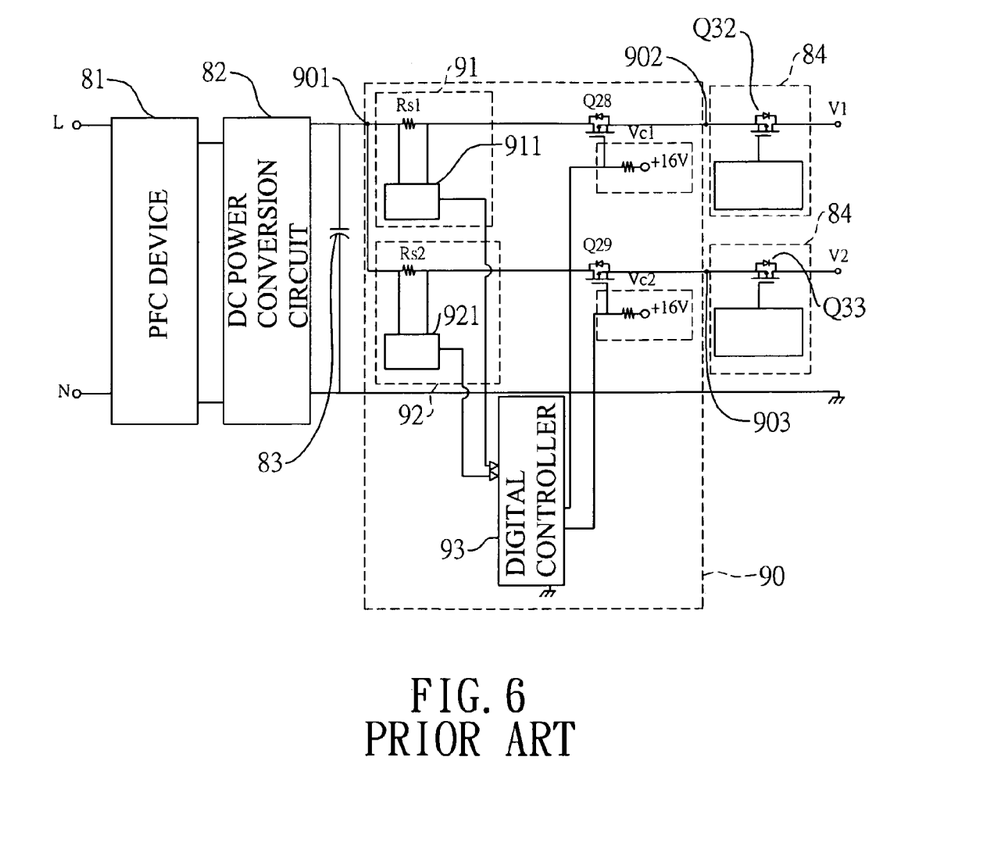
FIG. 6 is a circuit diagram of the conventional electronic circuit breaker in FIG. 5.

With reference to FIGS. 5 and 6, a conventional power supply having two output ports includes a power factor correction (PFC) device 81, a DC power conversion circuit 82, an output capacitor 83, two reverse voltage prevention units 84 and an electronic circuit breaker 90.

The PFC device 81 converts the AC power from AC mains into DC power. The DC power is further converted by the DC power conversion unit 82 and then outputted through the output capacitor 83.

Each reverse voltage prevention unit 84 has a FET (Field effect transistor) Q32 or Q33 and controls the FET Q32 or Q33 to turn on or off after detecting voltage of an input terminal and an output terminal of the reverse voltage prevention unit 84 so as to prevent the voltage of the output terminal of the reverse voltage prevention unit 84 from being greater than that of the input terminal and damaging the pre-stage circuit by a resulting reverse current.

The electronic circuit breaker 90 serves to open the circuit when detecting that current outputted by each output port is excessively large and further protect the pre-stage circuits and has an input port 901 and two output ports 902, 903. The input port 901 is connected with an output terminal of the DC power conversion circuit 82. The output ports 902, 903 are respectively connected to the two reverse voltage prevention units 84 and serve as output terminals of the power supply having dual output ports. One end of the output capacitor 83 is grounded and the other end is connected to the input port 901.

The electronic circuit breaker 90 further has two FETs Q28, Q29, two current detection circuits 91, 92 and a digital controller 93.

The drain and source of each FET Q28 or Q29 are respectively connected between the output capacitor 83 and one of the reverse voltage prevention units 84, and the gate is connected to a DC bias circuit Vc1 or Vc2.

The current detection circuits 91, 92 are respectively and serially connected between the FETs Q28, Q29 and the output capacitor 83. Each current detection circuit 91 or 92 has a current detection resistor Rs1 or Rs2 and a signal conversion unit 911 or 921.

The digital controller 93 is connected to the signal conversion unit 911, 921 and the FET Q28, Q29 of each current detection circuit 91, 92 and has a critical current value stored therein so as to acquire output current values of the signal conversion unit 911, 921 of each current detection circuit 91, 92, compare the output current values with the critical current value, control each DC bias circuits Vc1, Vc2 to supply a bias voltage to the gate of each FET Q28, Q29 and turn on or off the FET Q28, Q29. As to the digital controller 93 using an open collector, the digital controller 93 can turn on or turn off a corresponding DC bias circuit Vc1 or Vc2 by turning on or off the open collector.

The input port 901 of the electronic circuit breaker 90 is connected to the output ports 902, 903 through the FETs Q28, Q29 and the current detection circuit 91, 92. Based on the characteristics of a FET, an on state between the drain and source of the FET is determined by the bias $V_{GD}$ between the base and the drain of the FET. Given an N-type FET as an example, when the bias $V_{GD}$ between the base and the drain is greater than zero, the state between the drain and the source is on. When the bias $V_{GD}$ between the base and the drain is not greater than zero, the state between the drain and the source is off. Therefore, when no short circuit occurs, the digital controller 93 controls each DC bias circuit Vc1, Vc2 to supply a forward bias to a corresponding FET Q28 or Q29 so that the state between the source and the drain of the FET Q28 or Q29 is on, and the input port 901 is connected with each output port 902, 903. When a short circuit occurs in a post-stage circuit connected to one of the output ports 902, the current of the output port 902 abruptly rises. Meanwhile, the voltage drop value across the current detection resistor Rs1 also relatively rises. The digital controller 93 detects that the current of the output port 902 exceeds the critical current value through the signal conversion unit 911, and further gets the corresponding DC bias circuit Vc1 grounded so that the gate of the corresponding FET Q28 is grounded and has a zero voltage. Thus, the state between the source and the drain is off, and the input port 901 is disconnected from the output ports 902 to prevent the excessively large current from burning out the pre-stage circuit connected to the input port 901.

Figure 7:
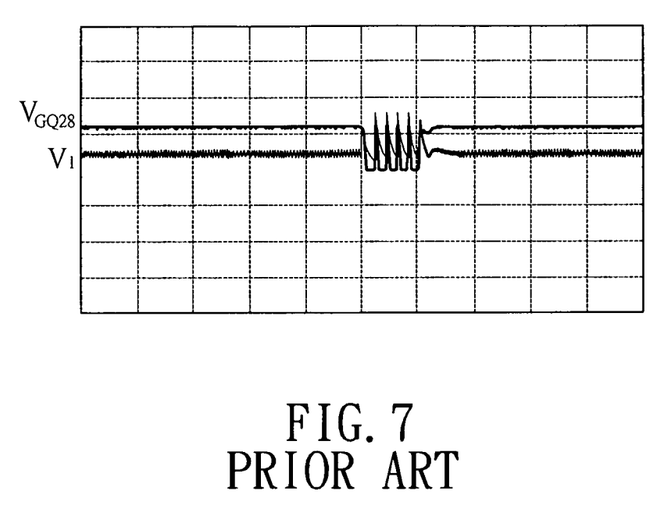
FIG. 7 is an output waveform diagram of the conventional electronic circuit breaker in FIG. 5.

Disconnecting the input port 901 from the output ports 902 makes the pre-stage circuit temporarily immune to the impact of the short circuit and also lowers the output current after the disconnection. The current detection circuit 91 keeps detecting the current value of the output ports 902 and reporting the current value to the digital controller 93. Once the digital controller 91 determines that the current value is less than the critical current value, the digital controller 93 controls its open collector to disconnect from the DC bias circuit Vc1 so that the gate of the FET Q28 returns to the status of high voltage and the state between the source and the drain is back on again. If the short circuit is still present at the output ports 902, the current value of the current detection circuit 91 surely exceeds the critical current value again. With reference to FIG. 7, as the FET Q28 keeps turning on and off, the current value between the input port 901 and the output port 902 continuously oscillates above and below the critical current value. When a short circuit stays on, such oscillation causes high-frequency large current with high-frequency oscillation to damage the circuit.

Furthermore, as the two current detection circuits 91, 92 are connected to the same input port 901 and commonly share the output capacitor 83, when a high-frequency large current is generated between the input port 901 and one of the output ports 902, the voltage outputted by the other output port 903 is unstable. With such unstable phenomenon the power supply having dual output ports fails to pass the requirements of relevant safety regulations, and the electronic circuit breaker 90 needs to be tackled with a solution.

SUMMARY OF THE INVENTION

An objective of the present invention is to provide an electronic circuit breaker of a power supply having dual output ports to avoid generation of high-frequency large current oscillation.

To achieve the foregoing objective, the electronic circuit breaker has an input port, two output ports, two field effect transistors, two current detection circuits and two control circuits.

A drain and a source of each field effect transistor are connected between the input port and one of the output ports, and a gate of each field effect transistor is connected to a DC bias circuit.

Each current detection circuit is serially connected between the input port and one of the field effect transistors and has a current detection resistor and a signal conversion unit.

Each control circuit is connected to the signal conversion unit of one of the current detection circuits and one of the field effect transistors and has a silicon controlled rectifier and an activation circuit.

The silicon controlled rectifier has an anode, a cathode and a gate. The anode and the cathode of the silicon controlled rectifier are connected to one of the field effect transistors.

The activation circuit is connected to one of the current detection circuits and one of the field effect transistors. When detecting an abrupt current rise at a corresponding output through a corresponding current detection circuit, the activation circuit activates a corresponding silicon controlled rectifier to turn on so that a corresponding DC bias circuit does not supply a bias voltage to a corresponding field effect transistor and the output port connected to the field effect transistor in an off state stops outputting a DC power.

The present invention employs the silicon controlled rectifier of each control circuit to control the supplying of a bias voltage to a corresponding FET and further controls the on and off states between the source and drain of the FET. The conditions for a silicon controlled rectifier to turn on are:

1. Forward bias is present between the anode and the cathode.
2. Forward bias is present between the gate and the cathode.

When an on state is present between the anode and the cathode, the forward bias of the gate does not affect the state between the anode and the cathode. If an off state between the cathode and the anode needs to be set, a zero bias voltage between the anode and the cathode should be set. In the case of an N-type FET, when a short circuit is present at one of the output ports, a corresponding control circuit detects that the current of the output port is excessively large through a corresponding current detection circuit and activates a forward bias to the gate of the silicon controlled rectifier so that the silicon controlled rectifier turns on and a corresponding DC bias circuit does not supply bias voltage to a corresponding FET to disconnect the output port from the input port. Although the current of the output port is reduced and the control circuit does not activate a forward bias to the gate, the state between the anode and the cathode of the silicon controlled rectifier remains on as the anode and the cathode are serially connected to the DC bias circuit. Hence, high-frequency large current and voltage oscillation of output capacitor can be avoided to ensure stable output voltage of the power supply. Besides, the present invention employs analog components to respond to a short circuit and directly control to turn off the FET. Without complicated digital operations such as sampling, computing, comparing and the like, the electronic circuit breaker can respond to thoroughly protect the pre-stage circuit at a faster speed.

Preferably, the electronic circuit breaker further has a digital controller. The digital controller has two input terminals, two open collector output terminals, a critical current value and a delay time.

Each input terminal is connected to the signal conversion unit of one of the current detection circuits.

Each open collector output terminal is connected to the anode of one of the silicon controlled rectifiers.

When detecting that current outputted from one of the output ports exceeds the critical current value, the digital controller starts counting time and outputs a low-voltage pulse signal to the anode of a corresponding silicon controlled rectifier until the delay time expires, so that no forward bias exists between the anode and the cathode of the silicon controlled rectifier and a state between the anode and the cathode of the silicon controlled rectifier is off. Hence, after the short circuit is fixed, the DC bias circuit supplies a bias voltage to the FET to automatically turn on the FET so as to resume power supply from the output port.

Other objectives, advantages and novel features of the invention will become more apparent from the following detailed description when taken in conjunction with the accompanying drawings.

DETAILED DESCRIPTION OF THE INVENTION

Figure 1:
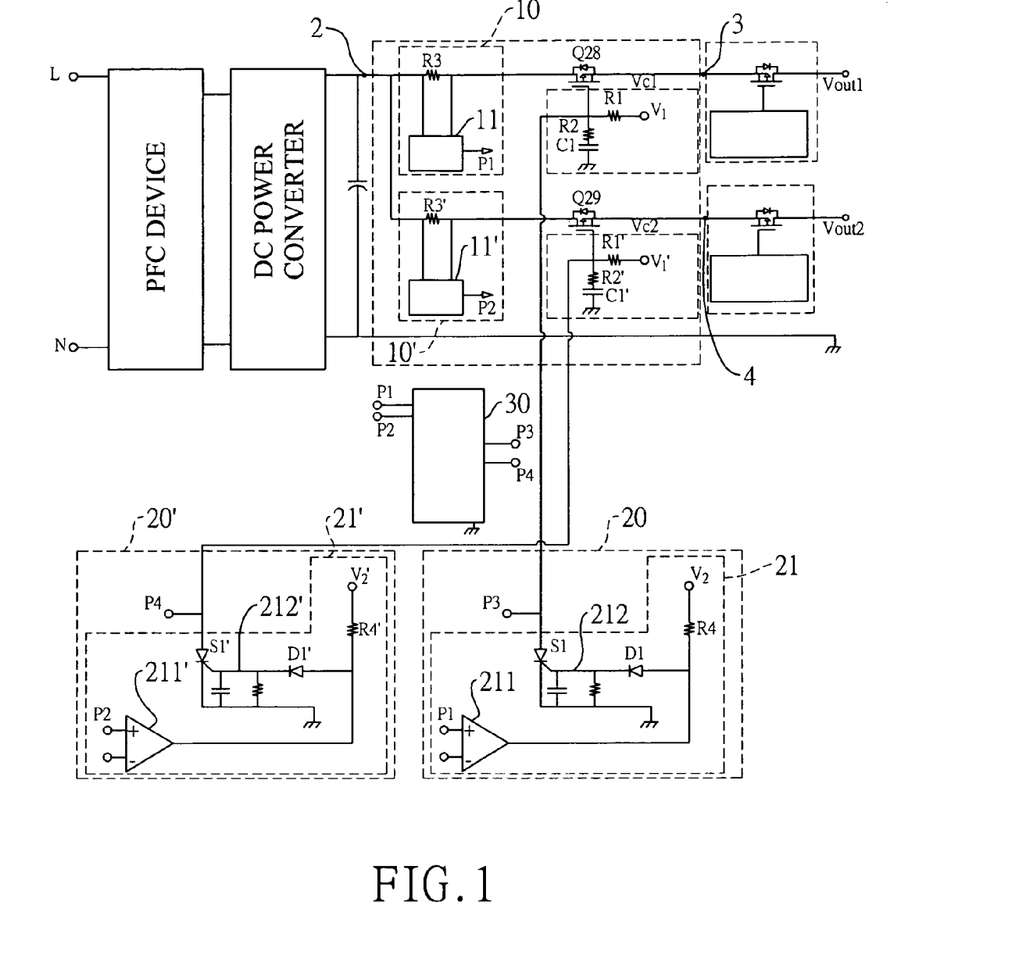
FIG. 1 is a circuit diagram of an electronic circuit breaker of a power supply having dual output ports in accordance with the present invention.

With reference to FIG. 1, an electronic circuit breaker of a power supply having dual output ports in accordance with the present invention has an input port 2, two output ports 3, 4, two DC bias circuits Vc1, Vc2, two FETs Q28, Q29, two current detection circuits 10, 10', two control circuits 20, 20' and a digital controller 30.

Each DC bias circuit Vc1, Vc2 has a positive terminal V1, V1', a ground terminal, a voltage divider having two resistors R1, R2, R1', R2', and a capacitor C1, C1' serially connected to the voltage divider, in which the voltage driver and the capacitor are connected between the positive terminal and the ground terminal.

The drain and source of each FET Q28, Q29 are connected between the input port 2 and one of the output ports 3, 4, and the gate is connected to one of the DC bias circuits Vc1, Vc2 and between the two resistors R1, R2, R1', R2' of the voltage divider.

Each current detection circuit 10, 10' is serially connected between the input port 2 and one of the FETs Q28, Q29, and has a current detection resistor R3, R3' and a signal conversion unit 11, 11'.

Each control circuit 20, 20' is connected to the signal conversion unit 11, 11' of one of the current detection circuits 10, 10' and one of the DC bias circuits Vc1, Vc2, and has a silicon controlled rectifier (SCR) S1, S1' and an activation circuit 21, 21'. Each SCR S1, S1' has three terminals, namely, an anode, a cathode and a gate. The anode and the cathode of each SCR S1, S1' are connected to one of the DC bias circuits Vc1, Vc2. The cathode of each SCR S1, S1' is grounded. Each activation circuit 21, 21' is connected to one of the current detection circuits 10, 10' and the gate of one of the SCRs S1, S1'. When one of the activation circuits 21, 21' detects an abrupt current rise at a corresponding output port 3, 4 through a corresponding current detection circuit 10, 10', the activation circuit 21, 21' activates a corresponding SCR to turn on so that a corresponding DC bias circuit Vc1 does not supply a bias voltage to a corresponding FET Q28, Q29 and a corresponding output port 3, 4 connected to the FET Q28, Q29 in an off state stops outputting a DC power. In the present embodiment, each activation circuit 21, 21' has a resistor R4, R4', a positive terminal V2, a diode D1, D1', and a comparator 211, 211'. A cathode of the diode D1, D1' is grounded through a parallelly connected RC circuit 212, 212'. A positive terminal of the comparator 211, 211' is connected to the signal conversion unit 11, 11' of a corresponding current detection circuit 10, 10'. An output terminal of the comparator 211, 211' is connected to the positive terminal V2, V2' of the activation circuit 21, 21' through the resistor R4, R4', and is further connected to the gate of a corresponding SCR S1, S1' after a forward bias connection with the diode D1, D1'. The comparator 211, 211' detects if the current outputted by a corresponding output port 3, 4 is greater than a critical current value in collaboration with the corresponding current detection circuit 10, 10' so as to determine if a short circuit occurs. After the short circuit occurs, the output terminal of the comparator 211, 211 outputs a high voltage to trigger a forward bias at the gate of a corresponding SCR S1, S1', the state between the anode and the cathode of the SCR S1, S1' is on, the anode of the SCR S1, S2 is grounded, and a corresponding DC bias circuit Vc1, Vc2 stops supplying bias voltage to a corresponding FET Q28, Q29.

The digital controller has two input terminals and two open collector output terminals. Each input terminal is connected to the signal conversion unit 11, 11' of one of the current detection circuits 10, 10'. Each open collector output terminal is connected to the anode of one of the SCRs S1, S1'. The digital controller 30 further has a critical current value and a delay time predetermined therein. When detecting that current outputted from one of the output ports 3, 4 exceeds the critical current value, the digital controller 30 starts counting time and outputs a low-voltage pulse signal to the anode of a corresponding SCR S1, S1' until the delay time expires, so that no forward bias is present between the anode and the cathode of the SCR S1, S1' and the state between the anode and the cathode of the SCR S1, S1' is off.

When a short circuit occurs in a post-stage circuit connected to one of the output ports 3, 4, for example, the output port 3, the comparator 212 of the control circuit 20 detects that the current outputted by the output port 3 is greater than the critical current value through a corresponding current detection circuit 10, and raises the voltage outputted from the output terminal of the comparator 211 to trigger the forward bias at the gate of the SCR S1 through the diode D1. The state between the anode and the cathode of the SCR S1 is on and the anode of the SCR S1 is grounded so that the DC bias circuit Vc1 does not supply the bias voltage to the gate of the FET Q28, the FET Q28 turns off and the input port 2 is disconnected from the corresponding output port 3 to protect the pre-stage circuit connected to the input port 2. As the input port 2 is disconnected from the output port 3, current flowing through the current detection circuit 10 is reduced, the voltage of the positive terminal of the comparator 211 becomes less than that of the negative terminal, and a low voltage is outputted from the output terminal of the comparator 211 so that forward bias at the gate of the SCR S1 is not present. However, the state between the anode and the cathode of the SCR S1 is still on, so the corresponding FET is turned off, and no high-frequency large current is generated accordingly. Additionally, detecting short circuit and turning off the FET Q28 is directly performed by analog components requiring no complicated digital operations such as sampling, computing, comparing and the like performed by digital components, and the electronic circuit breaker can respond to thoroughly protect the pre-stage circuit at a faster speed.

The digital controller 30 periodically outputs low-voltage pulse signals to the anode of the SCR S1 when a short circuit is present at the output port 3. Such low-voltage pulse signals cut off the forward bias of the anode of the SCR S1 and result in an off state between the anode and the cathode of the SCR S1. Then, the DC bias circuit Vc1 supplies the bias voltage to the FET Q28 to turn on the FET Q28. The input port 2 is connected with the output port 3 again. Hence, after the short circuit is not present, the input port is automatically connected with the output port 3 and the power supply having dual output ports can normally supply power.

Figure 2:
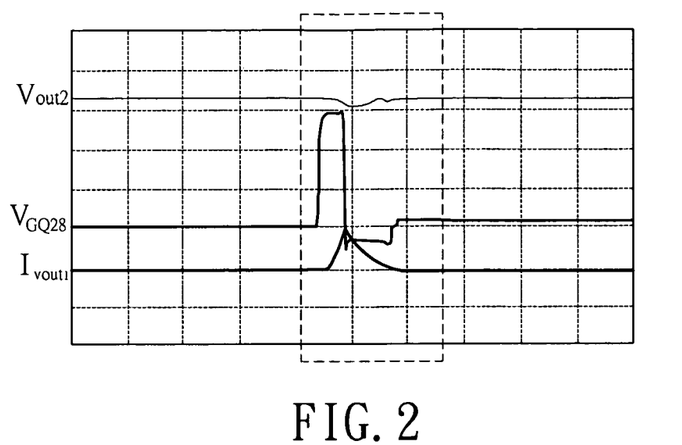
FIG. 2 is a first output waveform diagram of the electronic circuit breaker in FIG. 1.
Figure 3:
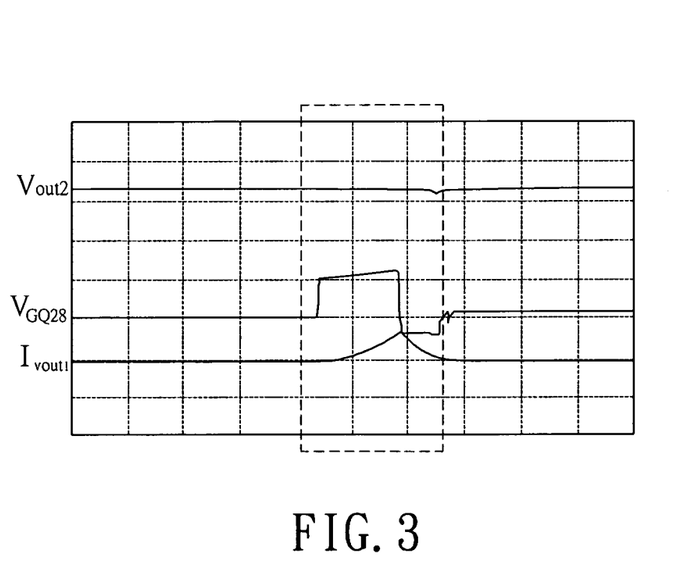
FIG. 3 is a second output waveform diagram of the electronic circuit breaker in FIG. 1.
Figure 4:
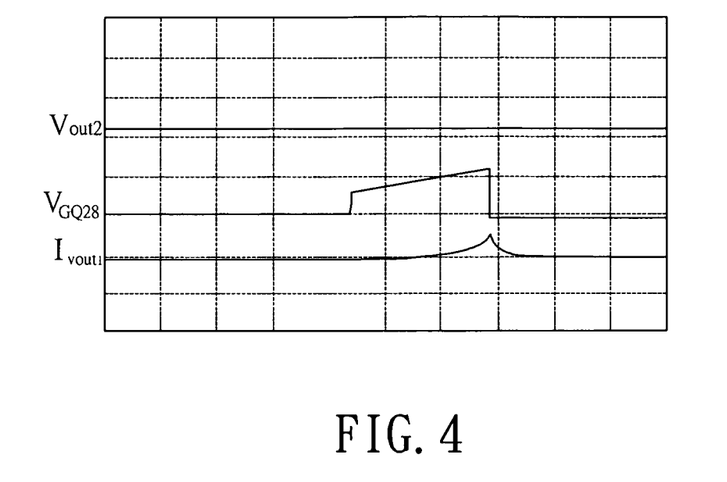
FIG. 4 is a third output waveform diagram of the electronic circuit breaker in FIG. 1.

With reference to FIG. 2, a waveform diagram of the DC bias circuit Vc1, Vc2 of the electronic circuit breaker in accordance with the present invention is shown when the DC bias circuit Vc1, Vc2 is not serially connected with the resistor R2, R2' of the voltage divider and the capacitor C1, C1'. After the state between the anode and the cathode of the SCR S1 is off, the bias voltage of the gate of the FET Q28 is supplied by the DC bias circuit Vc1 and goes up rapidly. A peak value of the bias voltage appearing in FIG. 2 affects the current to the input port 2 and also slightly affects the output voltage $V_{out2}$ of the other output port 4. To lower the peak value and gently raise the voltage of the DC bias circuit Vc1, each DC bias circuit Vc1, Vc2 is serially connected with the resistor R2, R2' of the voltage divider and the capacitor C1, C1'. The resulting waveform diagram is shown in FIG. 3. The reduced peak value of the FET Q28 is attributable to the voltage division, and the rising speed of the peak value is slowed down by the capacitor C1, thereby mitigating the influence to the current of the input port 2 and to the output voltage $V_{out2}$ of the output port 4. With further adjustment of the values of each resistor R1, R1', R2, R2' of the voltage divider and the capacitor C1, C1', the output voltage $V_{out2}$ of the output port 4 is not affected by the peak value as shown in FIG. 4.

To avoid the occurrence of high-frequency large current, to more rapidly respond to a short circuit and to provide an enhanced protection, the electronic circuit breaker of the present invention has the digital controller 30 to periodically cut off the SCR S1, S1' so that the power supply having dual output ports can automatically restore the normal operation after a short circuit occurring at one output port 3 is not no longer present. The DC bias circuits Vc1, Vc2 of the electronic circuit breaker further has the resistors R1, R1', R2, R2' of the voltage divider and the capacitor C1, C1' to alleviate the peak value of the bias voltage supplied by the DC bias circuits Vc1, Vc2 and make the other output port 4 immune to the influence of the peak value so as to meet the requirements of safety regulations.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electronic circuit breaker of a power supply having dual output ports, comprising:
   an input port;
   two output ports;
   two field effect transistors, wherein a drain and a source of each field effect transistor are connected between the input port and one of the output ports, and a gate of each field effect transistor is connected to a DC bias circuit;
   two current detection circuits, each current detection circuit serially connected between the input port and one of the field effect transistors and having a current detection resistor and a signal conversion unit; and
   two control circuits, each control circuit connected to the signal conversion unit of one of the current detection circuits and one of the field effect transistors and having:
      a silicon controlled rectifier having an anode, a cathode and a gate, wherein the anode and the cathode of the silicon controlled rectifier are connected to one of the field effect transistors; and
      an activation circuit connected to one of the current detection circuits and one of the field effect transistors, wherein when detecting an abrupt current rise at a corresponding output with a corresponding current detection circuit, the activation circuit activates a corresponding silicon controlled rectifier to turn on so that a corresponding DC bias circuit does not supply a bias voltage to a corresponding field effect transistor so that the output port connected to the field effect transistor in an off state and stops outputting a DC power.

2. The electronic circuit breaker as claimed in claim 1, further comprising:
   a digital controller presetting a critical current value and a delay time, and having:
      two input terminals, each input terminal connected to the signal conversion unit of one of the current detection circuits; and
      two open collector output terminals, each open collector output terminal connected to the anode of one of the silicon controlled rectifiers;
   wherein when detecting that current outputted from one of the output ports exceeds the critical current value, the digital controller starts counting time and outputs a low-voltage pulse signal to the anode of a corresponding silicon controlled rectifier until the delay time expires, so that no forward bias exists between the anode and the cathode of the silicon controlled rectifier and a state between the anode and the cathode of the silicon controlled rectifier is off.

3. The electronic circuit breaker as claimed in claim 1, wherein
   each DC bias circuit has a positive terminal, a ground terminal, a voltage divider consisting of two resistors and a capacitor serially connected to the voltage divider, wherein the voltage driver and the capacitor are connected between the positive terminal and the ground terminal; and
   the gate of each field effect transistor is connected to a dividing voltage node of the voltage divider.

4. The electronic circuit breaker as claimed in claim 2, wherein
   each DC bias circuit has a positive terminal serially connected with two resistors of the voltage divider and grounded through a capacitor; and
   the gate of each field effect transistor is connected between the two resistors of the voltage divider.

5. The electronic circuit breaker as claimed in claim 2, wherein each activation circuit has:
   a resistor;
   a first terminal;
   a diode; and
   a comparator, wherein a positive terminal of the comparator is connected to the signal conversion unit of a corresponding current detection circuit, an output terminal of the comparator is connected to the first terminal of the activation circuit through the resistor, and is further connected to the gate of a corresponding silicon controlled rectifier after a forward bias connection with the diode, the comparator detects if a current outputted by a corresponding output port is greater than the critical current value in collaboration with the corresponding current detection circuit so as to determine if a short circuit occurs, and after the short circuit occurs, the output terminal of the comparator outputs a high voltage to trigger a forward bias at the gate of the corresponding silicon controlled rectifier.

6. The electronic circuit breaker as claimed in claim 3, wherein each activation circuit has:
   a resistor;
   a first terminal;
   a diode; and
   a comparator, wherein a positive terminal of the comparator is connected to the signal conversion unit of a corresponding current detection circuit, an output terminal of the comparator is connected to the first terminal of the activation circuit through the resistor, and is further connected to the gate of a corresponding silicon controlled rectifier after a forward bias connection with the diode, the comparator detects if a current outputted by a corresponding output port is greater than the critical current value in collaboration with the corresponding current detection circuit so as to determine if a short circuit occurs, and after the short circuit occurs, the output terminal of the comparator outputs a high voltage to trigger a forward bias at the gate of the corresponding silicon controlled rectifier.

7. The electronic circuit breaker as claimed in claim 4, wherein each activation circuit has:
   a resistor;
   a first terminal;
   a diode; and
   a comparator, wherein a positive terminal of the comparator is connected to the signal conversion unit of a corresponding current detection circuit, an output terminal of the comparator is connected to the first terminal of the activation circuit through the resistor, and is further connected to the gate of a corresponding silicon controlled rectifier after a forward bias connection with the diode, the comparator detects if a current outputted by a corresponding output port is greater than the critical current value in collaboration with the corresponding current detection circuit so as to determine if a short circuit occurs, and after the short circuit occurs, the output terminal of the comparator outputs a high voltage to trigger a forward bias at the gate of the corresponding silicon controlled rectifier.

8. The electronic circuit breaker as claimed in claim 5, wherein a cathode of the diode is grounded through a parallelly connected RC circuit.

9. The electronic circuit breaker as claimed in claim 6, wherein a cathode of the diode is grounded through a parallelly connected RC circuit.

10. The electronic circuit breaker as claimed in claim 7, wherein a cathode of the diode is grounded through a parallelly connected RC circuit.

11. The electronic circuit breaker as claimed in claim 1, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

12. The electronic circuit breaker as claimed in claim 2, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

13. The electronic circuit breaker as claimed in claim 3, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

14. The electronic circuit breaker as claimed in claim 4, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

15. The electronic circuit breaker as claimed in claim 5, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

16. The electronic circuit breaker as claimed in claim 6, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

17. The electronic circuit breaker as claimed in claim 7, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

18. The electronic circuit breaker as claimed in claim 8, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

19. The electronic circuit breaker as claimed in claim 9, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

20. The electronic circuit breaker as claimed in claim 10, wherein the cathode of each silicon controlled rectifier is grounded, and when the state between the anode and the cathode of the silicon controlled rectifier is on, the anode of the silicon controlled rectifier is grounded, and a corresponding DC bias circuit stops supplying bias voltage to a corresponding field effect transistor.

* * * * *